United States Patent
Schmitter (10) Patent No.: US 7,168,062 B1
(45) Date of Patent: Jan. 23, 2007

(54) OBJECT-ORIENTED SOFTWARE SYSTEM ALLOWING LIVE MODIFICATION OF AN APPLICATION

(75) Inventor: Robert L Schmitter, King of Prussia, PA (US)

(73) Assignee: ObjectBuilders, Inc., King of Prussia, PA (US)

(*) Notice: Subject to any disclaimer, the term of this patent is extended or adjusted under 35 U.S.C. 154(b) by 0 days.

(21) Appl. No.: 09/559,224

(22) Filed: Apr. 26, 2000

Related U.S. Application Data (60) Provisional application No. 60/132,690, filed on Apr. 26, 1999.

(51) Int. Cl.
*G06F 9/44* (2006.01)

(52) U.S. Cl. ............... 717/110; 717/113; 717/108; 717/109

(58) Field of Classification Search ......... 717/153, 717/154, 155, 156, 165, 121, 120, 122, 168, 717/110, 113, 108, 109, 148
See application file for complete search history.

(56) References Cited

U.S. PATENT DOCUMENTS

| | | | | |
|---|---|---|---|---|
| 5,388,264 A | * | 2/1995 | Tobias et al. | 707/103 R |
| 5,485,617 A | * | 1/1996 | Stutz et al. | 709/315 |
| 5,583,983 A | * | 12/1996 | Schmitter | 717/138 |
| 5,640,566 A | * | 6/1997 | Victor et al. | 717/113 |
| 5,652,884 A | * | 7/1997 | Palevich | 707/100 |
| 5,842,020 A | * | 11/1998 | Faustini | 709/101 |
| 5,956,736 A | * | 9/1999 | Hanson et al. | 715/513 |

* cited by examiner

*Primary Examiner*—Wei Zhen
*Assistant Examiner*—Qamrun Nahar
(74) *Attorney, Agent, or Firm*—Akin Gump Strauss Hauer & Feld, LLP (57) ABSTRACT

An object-oriented software system permits live modification of objects deployed in an execution environment. The system comprises an inspector configured to modify the attributes of deployed object, and a means for selecting and launching inspectors configured for modification of corresponding objects in the execution environment. The system is capable of real-time or live updating of objects in an application or execution environment. As objects of an application are deployed into the execution environment, such as by de-archiving corresponding object documents, a document server process may register such deployment in order to provide access to corresponding inspectors. Applicants modified in accordance with the present invention can be re-archived to maintain such modifications when re-deployed on any desired platform.

33 Claims, 4 Drawing Sheets

OBJECT-ORIENTED SOFTWARE SYSTEM ALLOWING LIVE MODIFICATION OF AN APPLICATION

CROSS REFERENCE TO RELATED APPLICATIONS

Priority is claimed to U.S. Application No. 60/132,690 filed Apr. 26, 1999, which is incorporated in full by reference herein.

BACKGROUND

Businesses depend on computers for doing business, interacting with other businesses and interacting with consumers. Computer hardware technology is increasing daily at phenomenal rates. Business productivity software for doing desktop publishing, presentations, word processing, and minor business functionality is at an all time high, when it comes to the capability and ease of use. However, one area of the market in software development that is considerably lagging behind is the area of business software development or customized application development.

Many businesses are still using legacy-based systems that are running terminals, mainframes and coded primarily in COBOL. These systems usually consist of millions of lines of code. In order for business software development to move forward at a rate equivalent to hardware technology and other productivity software a new strategy of customized application development is needed. Despite the advances in technology, especially in the area of object-oriented programming, which promised massive reuse and extreme productivity, the productivity levels are still very limited when compared to hardware or other productivity software. The primary reason for this is that there is still too much coding required to produce custom business applications.

Some software environments give the user limited capabilities to assemble objects. Typically the result of assembling these objects is some type of code generation which then can be further customized by a skilled developer. Also these assembly tools are not tied to the actual running application, so that there are one or several steps between what an end user of the application would see and what the developer is actually seeing. These steps typically include some type of code generation, compilation, linking and then some combining of resources into an executable package which can then be run for the user. It is in this area that there are significant productivity losses as well as the need for the skilled resource or artist.

U.S. Pat. No. 5,583,983, which is incorporated in full by reference herein, describes a software deployment system in which an application is deployed within a computer on the basis of an archive, defined therein as an "object document". The object document specifies what objects make up the application and the current state of each attribute of each object. The object document also defines the structure of the software application by specifying how the objects communicate to each other. The objects are usually linked together in an executable that either contains the object or has direct or indirect access to the disparate objects that make up a particular application.

As described in the '983 patent, the execution environment is provided with the ability to de-archive one or more object documents at runtime, which recreates the objects and their relationships to each other in the computer system. The de-archiving process consists of an object, commonly referred to as an Archiver object, which provides the capability of both persisting and awakening (archiving and de-archiving) the document. These two processes enable such object documents to be used as a dynamically changeable information source for both programming logic and data. Also, such object documents can reference each other to dynamically retrieve, load and awaken other object documents. The execution environment further includes the ability to bring in a starting document. This starting document could either automatically have the ability to retrieve other documents to perform its total functionality, or allow the user to access other documents which represent the entire application.

In one embodiment described in the '983 patent, objects are provided with a "Get" method, for obtaining their attributes from an archive, and with a "Put" method, for storing their attributes into an archive. However, once an application is deployed, its functionality remains static while the application is being executed. Other object-oriented application paradigms include methods by which objects store and retrieve their attributes, but such attributes remain static within the execution environment. It is desirable to provide an execution environment in which the attributes of the constituent objects could be modified, without having to resort to using a separate development environment for modifying the application. In such an environment, standard libraries of applications could be developed such that they would be readily customizable to meet the needs of a particular business. That is by changing an object's attributes, the functionality of the application will change "on the fly" in the runtime environment with no need for loading, compiling or linking.

SUMMARY

In accordance with the present invention, an object-oriented computer program execution environment is provided with mechanisms for allowing a user to inspect and to modify attributes of objects and add additional objects within an object-oriented computer software application while the application is deployed and running in the execution environment. According to one aspect of the invention, the environment allows the user to make modifications to object attributes while the application is running and deployed therein. Upon selecting a save function for the application, the modifications are permanently saved into an appropriate object archive file, herein referred to as an object document, corresponding to the modified object. Such an object document can be reloaded and reconfigured and saved again, to allow multiple reconfigurations. This reconfiguration is facilitated by using the actual data of the instance of application created to give the user a better idea of what end results such reconfigurations determine.

According to another aspect of the invention a document server application is provided within the execution environment for maintaining an inventory of objects deployed within the environment, and for allowing additional objects to be added to a live application. The document server monitors all the objects in the document being edited and can provide access to modification objects, herein referred to as inspectors, for editing the application objects and associated object documents. The document server and inspectors can act as part of the application or as a totally separate application communicating to the runtime applications through commonly available distributed messaging mechanisms such as CORBA, COM, RPC, and DDE. Additionally, a build application can be provided and used to generate custom applications that can be tested as they are executed in a similar environment to the execution environment and, ultimately, deployed in an execution environment. This build application could also be set up to act directly on the execution environment and thus not require the document server to contain or have access to all the objects in the document being edited, because the execution environment containing the objects would provide a mechanism for accessing the objects or provide a registry for accessing the objects. The build application may also provide for object substitution, where the build object could simulate or substitute to the best of its ability a generic place holder object. This place holder would control the proper editing and saving of attributes as well as the simulate the functionality of the specified, yet unavailable, object to the extent possible.

BRIEF DESCRIPTION

DETAILED DESCRIPTION

Figure 1:
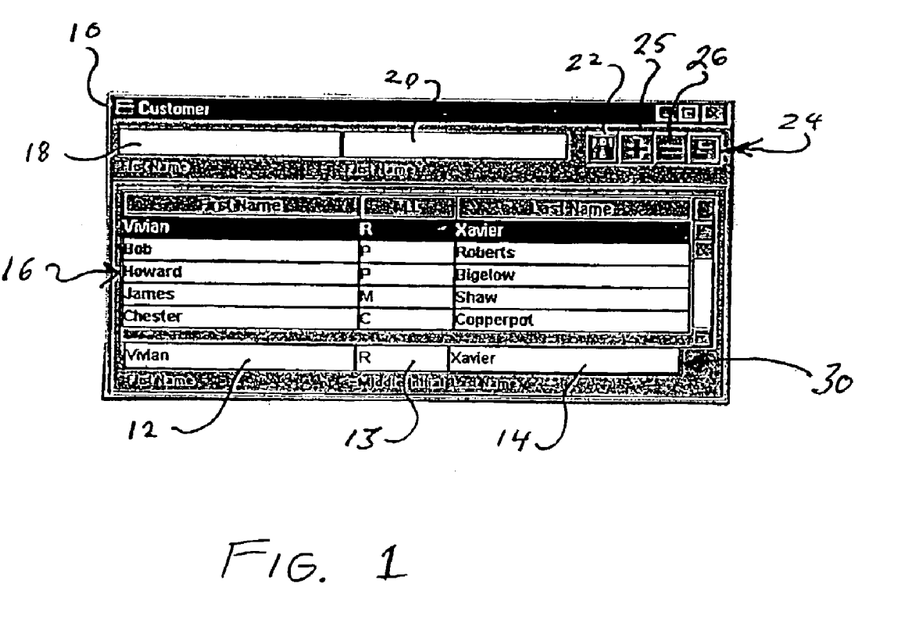
FIG. 1 is a screen display of a window produced by an exemplary software application.

Referring now to FIG. 1, there is shown a screen display for an exemplary software application, which is configured to produce a window 10 that will accept customer names as text entries in text entry boxes 12–14, and to store the entered names in a list of customers 16. The application consists of an executable capable of launching two object documents. As described in U.S. Pat. No. 5,583,983, object documents can be launched in the execution environment by a de-archiving process. The first document, the main document (not shown) provides the interface, menu and the background that the user will actually see. This is commonly referred to as a multiple document interface in the WINDOWS environment, consisting of a menu, tool bar and status bar. This document could be manifested in a variety of ways on different machines and architectures. However, for the purposes of this example the appearance under Microsoft Windows operating environment shall be used. The second document it contains is a user entry screen for input, update, and deletion of customers as shown in FIG. 1. A customer entry here will contain the customer's first name, middle initial, and last name.

The user double-clicks on the executable to launch the program. The executable uses a de-archiving process described in U.S. Pat. No. 5,583,983 to read in the main object document file and begin execution. The document file launches the user interface where the user can then select from the process menu the customer option, which will bring up the second document, the customer window.

Alternatively the main document and customer document could be accessed differently in different execution environments. For example in a web browser based environment the documents would be streamed into the browser itself and de-archived onto one or more pages of the browser environment. The object document and live modification is independent of the operating and execution environments. The underling operating system calls and foundation objects available in all execution environments will provide the mechanism needed to handle inconsistencies in current execution environments and allow the invention to target new execution environments in the future.

The customer window 10 contains the following objects: a viewer 30, which is commonly represented as a box on the user interface, which contains inside of it three TextFields 12–14 and a selection list 16. The three TextFields 12–14 are for entering the first name, middle initial, and last name and they are appropriately labeled. The viewer also contains a selection list 16 with first name, middle initial and last name for easy selection of the record the user wishes to view. Above the viewer object are two search fields 18, 20 and a search button 22. One search field 18 is associated with the first name, and one with the last name 20. This will allow the user to search on the particular customer they are looking to view or modify. Also there are additional buttons 24 that allow the user to save updates, a button 25 that will allow the user to add a new customer and a button 26 that will allow the user to delete a particular record. This completes the functionality in the customer window 10.

This functionality is contained in a single object document called the customer document. The customer document consists of objects and their associated attributes. This document and its functionality were completely assembled utilizing the invention environment. Any of its functionality can be modified or enhanced in the execution environment.

Such an object document, which may be part of a larger set of object documents, together making an application, would perform the functions of creating, modifying and deleting customer records. This application is the result of a set of objects and two documents. The objects were compiled and linked into an executable and the object documents consist of persistent object graphs. Any format, file, or other mechanism for providing object persistence can be utilized in accordance with the present invention. For example, such formats as relational database tables, HTML, XML, binary and ascii file formats are included within the range of equivalents contemplated within the scope of the invention. The executable is a program comprising a set of objects created via standard development functionality or standard products such as Visual C++ or Visual Basic. Alternately, the executable could be created in any mechanism by which an executable can be created or a machine readable program can be created and executed and hence there exists the capability for the modification. Alternately, the objects do not have to be directly linked into the executable, they could be accessible to the execution environment, such as by access to remote resources via a computer network. Remote objects and documents can be obtained, accessed and launched as needed.

Figure 2:
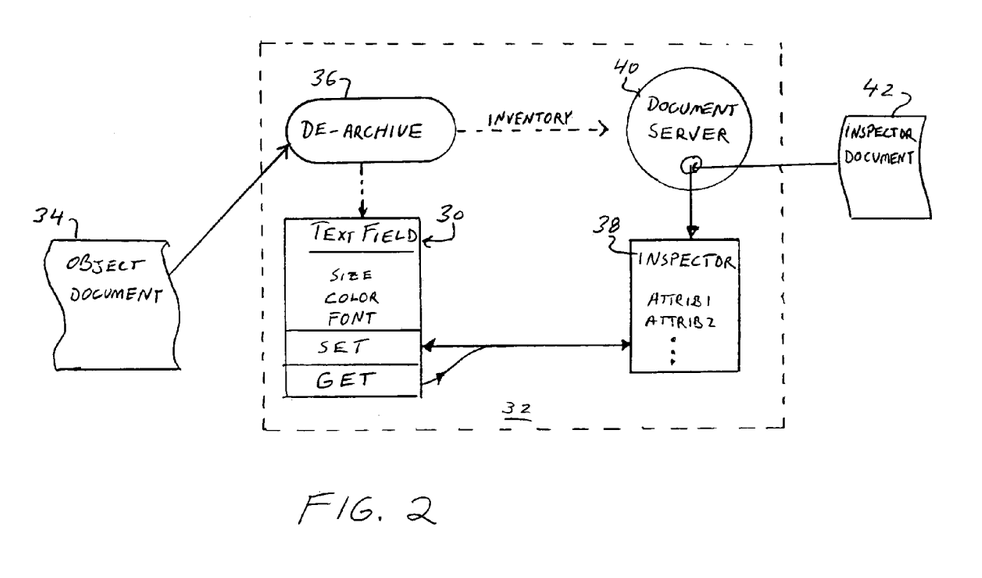
FIG. 2 is a block functional diagram showing an object of the application of FIG. 1, and an external application for communicating information pertaining to the attributes of the object.

Referring now to FIG. 2, there is shown an object of the application as stored in the executable memory of the operating environment. The object, for example a TextField object 30, is instantiated into the executable memory 32 when the main object document 34 is de-archived by a de-archiving process 36 upon launching the application. The object is provided with "Set" and "Get" methods to allow the object to retrieve its attributes from an object document, and to store its attributes to an object document. In accordance with the present invention, the execution environment is further provided with an interface for accessing the "Set" and "Get" methods of the object in order to receive messages representing its current attributes. "Set" and "Get" methods are referred to herein to describe any mechanism for accessing and modifying an object's attributes, such as methods provided in a standard object-oriented system by which objects obtain their attributes upon instantiation. The execution environment is further provided with methods for receiving messages representing new or different attributes, and for implementing the new or different attributes. Such a method for communicating information and for altering the attributes of an object shall be referred to herein as an "inspector object".

For example, as shown in FIG. 2, the inspector object 38 for the TextField object 30, can be actuated by the user in order to present a display of the attributes of the TextField object 30. Such a display would include the attributes of the size of the TextField object 30, the font, and the background color of the displayed text-entry field provided by the TextField object 30. When the inspector object 38 is actuated, the inspector object 38 accesses the appropriate methods of the TextField object, is actuated, reads the attributes of the TextField object 30 and sends them to a display window associated with the inspector, here after referred to as the "inspector window".

The inspector object 38, through the inspector window for example, further allows the user to select and/or change the attributes. When the user applies these changes, the inspector object accesses the appropriate "Set" method of the TextField object, and the TextField object then continues operation with the new attributes.

As can be appreciated the present invention provides an inspector object, which is external to the software application, and is configured to access the objects within the software application in order to obtain and modify attributes thereof. One way of providing the user with access to appropriate inspectors is to provide a "document server" 40. The document server 40 maintains or accesses (e.g. via a system, application or object registry) an inventory of objects deployed in the execution environment. For example, the document server 40 can be configured to monitor the de-archiving process 36 in order to develop the inventory as objects are deployed within the execution environment. The document server 40 can also provide the user with a visual interface to inspector documents, such as inspector document 42 corresponding to the inspector object 38. By managing access to inspectors and objects, the document server 40 can provide for selective re-archiving of modified objects so that later, when the application is archived to an object document, the TextField object 30 will be archived with the changed attributes. The document server 40 may record whether changes have been made to any of several object documents associated with an application, and can selectively re-archive any object's documents whose attributes have been modified.

As can be appreciated, the method described thus far would provide for modification of visual, user-accessible components of the application. In order to provide a more comprehensive ability to modify all objects of the application, including objects which are not directly associated with a visual component, the document server 40 includes a set of dictionaries that manage the documents that are currently in memory and the objects that are in each document. These dictionaries hold the information about all the objects contained inside a document whether the objects are visual or non visual objects. When the application is launched from within the execution environment, the document server 40 monitors the de-archiving process to generate a record of each instantiated object, and provides a messaging channel for reaching the inspector methods corresponding to each instantiated object. The basic function of the document server is to keep track of what objects belong to what documents at runtime. When a user makes modifications to a particular document or set of documents and performs the save function, the Document server records which objects to save with the particular document that the user has selected for saving. Alternatively the Document server's dictionaries could be populated by alternative methods. Instead of monitoring the de-archiving process, a separate mechanism could be provided to communicate such information directly to the document server 40; or the document server 40 can be configured to obtain such information from a system, application or object registry. In such alternative embodiments, the document server is not required to be pre-deployed in the execution environment prior to launching an application, but could be invoked as desired when modifications are to be made.

Figure 3:
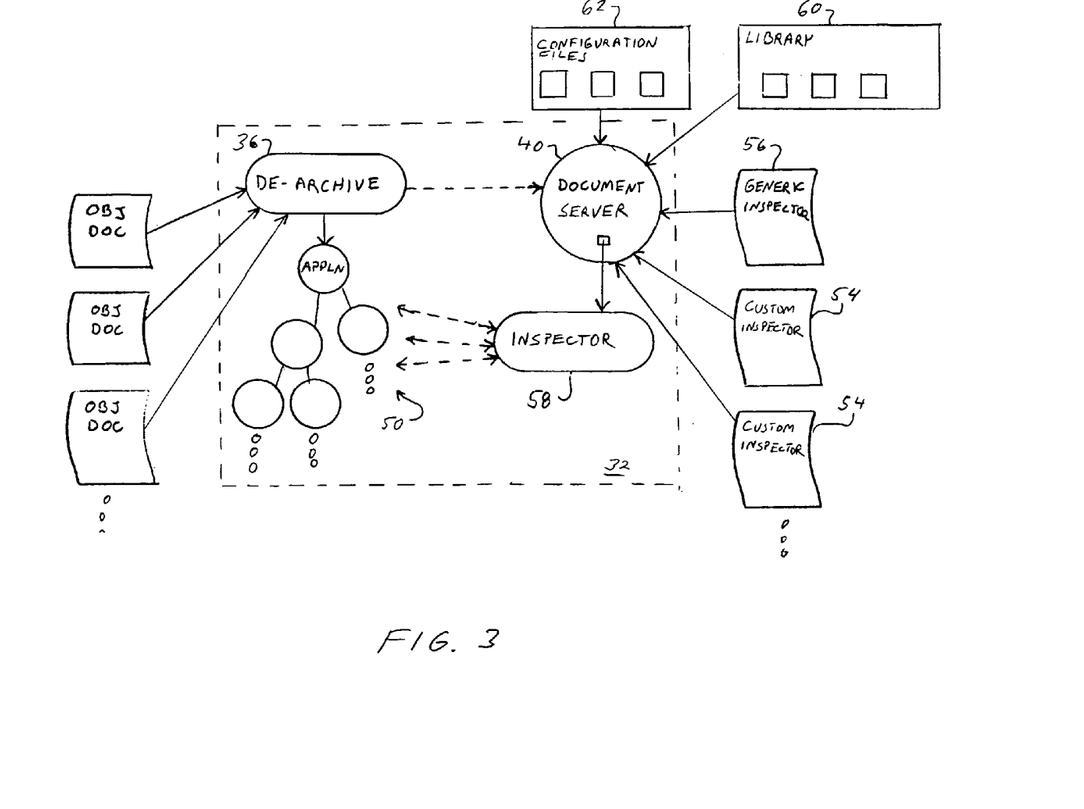
FIG. 3 is a block functional diagram of the application of FIG. 1 within an execution environment providing modification access to the application.
Figure 4:
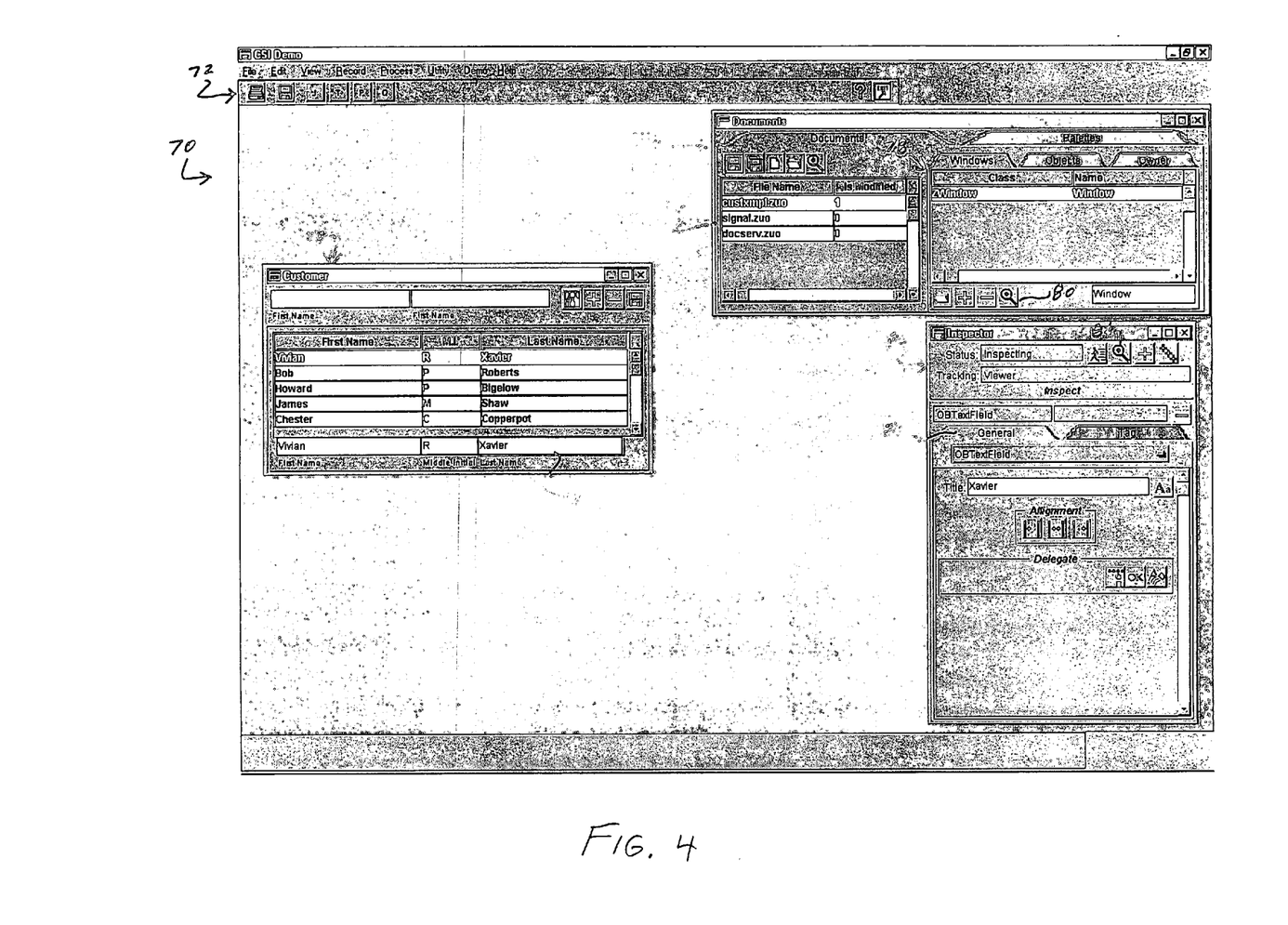
FIG. 4 is a screen display generated within the execution environment of FIG. 3.

Referring now to FIG. 3, there is shown the customer record entry application discussed above, as deployed within the execution environment incorporating the document server. A corresponding screen display 70 is shown in FIG. 4. A toolbar 72 is provided along the top of the screen for accessing features of the execution environment, including the document server. When the user desires to modify an aspect of the application, the user activates an option corresponding to the document server. The document server opens the window shown as document server window 74. The document server window 74 includes a list 76 of the object documents currently loaded into the execution environment and, for each of the object documents, a list 78 of objects associated with that document. For example, as shown in FIG. 4, the document server window 74 shows that the object "custxmpl.zuo", corresponding to the customer entry application, is loaded into the memory of the computer. The document server window displays all of the objects associated with an application, including non-visual objects, and allows access to the inspector methods that have been associated with each object.

In order to communicate with the inspector methods of each of the objects loaded into memory, the document server 40 may be provided with access to custom inspector documents 54 defined for the objects. Alternatively, for modifying objects for which a custom inspector is not defined, the document server may also have access to a generic inspector object template 56, which can be de-archived and populated with a list of available attributes that were detected and loaded when the object in question was de-archived upon launching the application. The generic inspector object 56 provides a standardized interface to the appropriate inspector methods of the objects of an application. This way, new objects can easily be added to the system without creating a custom inspector. The generic inspector will read the objects attribute list and set and get methods from common current and future mechanisms such as a system, application or object registry (for example IDL and COM).

During normal operation of an application, an inspector 58 can be launched by selecting an object listed by the document server 40 and by actuating an inspector icon 80 located in the Document server document window. This icon 80 will bring up the inspector window 82. The inspector window 82 displays and allows modification of the attributes of an existing object. Such an object can be defined as an encapsulated entity having certain characteristics defined by its properties or attributes or data that it holds, and those functions or processes which it performs. The inspector object 58 communicates to such an object, inspecting it via messaging, preferably with the inspector methods of the object or with a designated, specific interface which said object supports.

For example, if the user clicks the inspect button 84 in the inspector window 82, a message is sent to change the status of the application from a running condition to an inspection condition. Then, if the user positions the mouse over the customer window 10 and selects the customer last name TextField 14, the inspector window 82 itself will load in all the inspector documents 54 that have been defined to be associated with inspecting the properties of the TextField object 14. If the user wishes to change the border or the background of the TextField 14, the user can move the inspector window 82 to the associated inspector that allows modification of the background or border of the TextField object 14. The background color can then be changed through the view inspector. The view inspector is brought up by selecting the general tab 86, and then selecting the view inspector from the pop up menu 87. At this point the inspector 82 will display a property modification screen associated with the view class object. The user can now go click on the background color button, which will bring up a color panel where they can select a different color, for example the color red. Upon hitting OK the background of the TextField will change to the color red. In order to implement this change, the user selected attribute is communicated to the inspector method of the TextField object 14, which then modifies the appropriate attribute of the TextField object 14 within the memory of the computer where the TextField object is held. Unlike other development systems where this information might be stored in an alternate environment and then translated into a run time mechanism, in this approach the information is passed directly to the run time object instructing this object to instantly change its color to red. Hence the development cycle of coding, compiling, testing, and de-bugging, is eliminated.

Alternatively, different methods for selecting objects can be provided that do not change the status to an inspecting status. Selecting an object from a list in the document server or by instructing the document server that the next object clicked on will be the selected object, allows the application to stay in a pure runtime or execution mode.

As can be appreciated it is necessary for the objects to be able to respond to certain messages from the inspector in order to be able to perform their updating functionality. However, it is important to recognize that all of the objects already contain messages for getting and setting their basic attributes or functionality in conjunction with the archiving and de-archiving function, and that the inspector methods can easily be defined to access the characteristics of a specific object. A fundamental property of any object is to provide accessibility to set and get its attributes. In this way, new objects introduced into the execution environment can be adapted to be compatible with an inspector no matter what language or by what process they were created and introduced into the execution environment. When a custom inspector document is created, the various messages that will be passed to the object upon its inspection are specified. Hence, new custom or specific objects can be created in the document server environment by simply creating an inspector, which is in itself a document, that can be archived and de-archived in the same approach as has been described. This feature allows the capability of introducing new objects and also new messaging capabilities. The generic inspector as previously described, eliminates the step of creating a custom inspector. However, the generic inspector is, itself, an object having attributes that can be modified and customized to create a custom inspector by the methods described herein.

In an alternative embodiment, inspector windows can be invoked by incorporating the inspector functionality into the execution environment. For example, in a Windows environment, the inspector functionality can be incorporated into the "right click" menu options of the environment. Then, by selecting an "inspect" function from the menu, an appropriate call would be made to invoke a document server function to identify the object making the call, and then to select and launch an appropriate custom inspector for that object or to generate and populate a generic inspector.

In addition to managing an inventory of currently-loaded objects making up a software application, the document server may be provided with access to a library 60 of object documents corresponding to objects available to be integrated into the current application. Hence, in addition to providing the capability of modifying pre-existing objects within the application, the document server 40 provides the ability to add new objects and object documents to the application via the document server object itself. Such additional objects may be displayed in the document server window as a palette of available objects. For example, in order to add a new visual object to the application, the user may select from the palette or list of available objects, specify the attributes of the object to be added, and then the document server will send the specification of the object to the application and add the new object to the application. For visual objects, the document server may be configured to allow such objects to be visually dragged into the application display directly.

As can be appreciated, a custom inspector for each object that may be utilized within an application can be configured to specifically act upon the attributes of each object. At the time the object is defined, the inspector is customized to obtain and communicate relevant attributes with the get and set attributes of the object. In this manner, the basic document server environment is not rendered obsolete by the development of new objects having configurable attributes beyond those presently accessible via a generic inspector. Additionally, when new objects are created, it may be desirable to generate a configuration file describing the properties, methods and attributes of the object in a standardized format. Such application files 62 may also be made available to the document server or other mechanism for generating a custom inspector on the basis of information contained in the corresponding configuration file.

The flexibility provided by the document server environment for program modification, and for addition of further objects to an application, provides the ability to use the document server function as the basic platform upon which additional enhancements may be added. For example, the document server may be enhanced to provide for version tracking of an application under development, file management functions such as opening and saving applications, generating documentation, and automating application construction along the lines of a "wizard" model. It will also be appreciated that by acting upon the live executable objects deployed in a run-time environment, the modifications features provided in accordance with the present invention are not limited to a set of features available in, or dictated by, development environments tailored for any one particular language or platform. Because the modified objects can be archived after modification via an inspector, the modification of objects is accomplished independent of the environment or language in which the objects may have been originally developed. Moreover, in accordance with the principles of U.S. Pat. No. 5,583,983, a software application can be imported from any development or deployment environment, modified in the present execution environment, and then exported (via the archive) to any other execution environment. The modifications made in one environment will be reflected in the appropriate native format in a second environment (or substituted with a placeholder object in the second environment if not applicable in the second environment). In order to develop a new custom application, the user may be provided with a menu of applications which, although not specifically tailored to meet the user's needs, are generally similar to the application desired by the user. For example, in the customer data entry application described above, the user may generally select the category of customer data entry, and then the document server will assemble the application in response to user specifications of each of the attributes called for by the various inspector objects associated with the generic customer data entry application. After specifying the attributes of each object in the generic customer data entry application in order to produce a customized version, the user may be provided with options to add any of the additional functions represented by the library of objects available to the document server. At each stage of customization, the objects assembled thus far will be "live" and functional within the execution environment, thus eliminating a several steps in the traditional software development loop. The developer, or even the user seeking to modify the application, is provided with a "what you see is what you get" (WYSIWYG) view of the application even as it is being modified. Because the "development environment" hereby converges with the execution environment, the view provided to the developer and user employing the same execution environment is the same view of the application. Thus development time is reduced while maintaining an effective mechanism ensure quality control of the features and functionality of the application. The cross-platform deployment system provides equivalent native representations to developers and users employing different platforms. As noted in the '983 patent, it should be appreciated that a single object document may contain multiple representations intended for conditional deployment into various execution environments, such as by providing alternate manifestations of the user interface. However, alteration of attributes of, for example, the user interface within one environment will be reflected when the interface is deployed in a different environments.

The flexibility provided by the document server environment for program modification, and for addition of further objects to an application, provides the ability to automate the creation of system and user documentation. Significant documentation is lacking for most applications in commercial use today. In this type of approach, a utility could be created that reads the document files and automatically produces significant amounts of documentation describing the technical and end user workings of a particular document. This particular utility could then store this information and manage this information. If, for example, in an application consisting of hundreds of documents and an update were to be made everywhere in the application where a customer is displayed, that this update may allow for the visual display of fifty characters instead of the previous twenty-five. To implement the change, the user would select a document utility and perform a search on the object document files for the field—customer last name. It would then return all the documents and the associated location of customer last name fields, allowing the user to easily go through the application and make the requested modification manually or automatically to all selected locations at once. Additionally, user documentation could be extracted through a utility to provide step by step instructions for the users. These utilities will extend the productivity environment of this patent. Additional utilities for automating the construction of a software application in the same way as described above include: User interface creation, workflow and process creation, business object model, specification creation and integration, artificial intelligence for the creation of documents, creation of new objects as documents.

It will be appreciated that methods of the present invention are well-adapted for monitoring and modifying software applications intended for distributed access, such as via a computer network. When the software application is a server-side executable, the live modification process described herein considerably reduces "down time" required by traditional methods of modification within a separate development environment and re-deployment on the server platform. Additionally, for client-side software applications, the present invention allows customization of a distributed application by providing remote access to a document server function, or by allowing software applications to be distributed to environments having local access to a document server function. In the latter embodiment, the application can be distributed (e.g. into a web browser "plug-in" environment) along with appropriate inspector documents to allow user modification of all, or a selection of, the objects contained in the application.

The terms and expressions used herein have been terms of description, and not of limitation. The description of particular aspects of the invention is not intended to limit the scope of the invention, which is defined in the claims and intended to encompass all equivalents and obvious modifications thereof.

That which is claimed is:

1. An object-oriented software system on a computer system, comprising:
    an execution environment;
    an application executing within the execution environment, comprising a plurality of application objects;
    a first inspector object, executable within the execution environment, configurable to communicate with a method of a first application object of the application executing in the execution environment independently of the first inspector object, to modify a first attribute of the first application object;
    a first inspector document, associated with the first inspector object and independent of the first application object, configurable to describe the first attribute of the first application object; and
    a server configured to add the first application object, the first inspector object, and the first inspector document to the execution environment, to provide a user interface to the first inspector object, and to configure the first inspector object and the first inspector document for communication with the first application object,
    wherein the application provides a single view for both end users and developers of the application.

2. The object-oriented software system of claim 1, further comprising:
    a second inspector object, configurable to communicate with the first application object to change a second attribute of the first application object; and
    a second inspector document, associated with the second inspector object and independent of the first application object, configurable to describe the second attribute of the first application object.

3. The object-oriented software system of claim 1,
wherein the first inspector object is further configurable to communicate with a method of a second application object executing in the execution environment independently of the first inspector object, to modify an attribute of the second application object,
wherein the first inspector document is further configurable to describe the attribute of the second application object,
wherein the first inspector document is independent of the second application object, and
wherein the server is further configured to configure the first inspector object and the first inspector document for communication with the second application object.

4. The object-oriented software system of claim 1, further comprising:
a second inspector document, associated with the first inspector object,
wherein the first inspector object is further configurable to communicate with a method of a second application object executing in the execution environment independently of the first inspector object, to modify an attribute of the second application object,
wherein the second inspector document is configurable to describe the attribute of the second application object,
wherein the second inspector document is independent of the second application object, and
wherein the server is further configured to configure the first inspector object and the second inspector document for communication with the second application object.

5. The object-oriented software system of claim 1,
wherein the server is further configured for searching and identifying each of the plurality of application objects having a common attribute selected for modification, to allow selective modification of each of the identified application objects.

6. The object-oriented software system of claim 1, wherein the first inspector object is configured to generate a display of the first attribute.

7. The object-oriented software system of claim 1, wherein the method of the first application object modifies the first attribute.

8. The object-oriented system of claim 1, further comprising:
means for archiving the first application object as modified by communication between the first inspector object and the first application object.

9. The object-oriented system of claim 8, further comprising:
means for retrieving the first application object as archived by the means for archiving.

10. The object-oriented system of claim 1, wherein the execution environment comprises a web browser.

11. The object-oriented system of claim 1, wherein the first attribute is a visual attribute of the first application object.

12. The object-oriented system of claim 1, wherein the communication between the first inspector object and the first application object modifies the first attribute to be conditionally dependent on a characteristic of the execution environment.

13. The object-oriented system of claim 1, further comprising:
an inventory of application objects executing in the execution environment, maintained by the server.

14. The object-oriented system of claim 1, the server further configured to select the first inspector object from a plurality of inspector objects managed by the server, the server selecting the first inspector object depending on the first application object and instantiating the first inspector object in the execution environment.

15. The object-oriented system of claim 1, further comprising:
a library of objects,
wherein the server is configured to select and instantiate objects from the library of objects for execution in the execution environment.

16. The object-oriented system of claim 1, wherein the server is further configured to maintain a history of modifications made to the first attribute.

17. An object oriented software system on a computer system, comprising:
an execution environment;
an application executing in the execution environment, comprising a plurality of application objects;
a plurality of inspector objects, each executable within the execution environment, and each configurable to communicate with a method of a corresponding application object of the plurality of application objects executing in the execution environment independently of the plurality of inspector objects, each of the plurality of inspector objects configured to request the corresponding application object to modify an attribute of the corresponding application object;
a plurality of inspector documents, each associated with one of the plurality of inspector objects and independent of the corresponding application object, each configurable to describe the attribute of the corresponding application object; and
a server configured to select and instantiate application objects, inspector objects, and inspector documents in the execution environment, to provide a user interface to the each of the inspector objects, and to configure each of the inspector objects and the inspector documents for communication with the corresponding application object,
wherein the application provides a single view for both end users and developers of the application.

18. The object-oriented system of claim 17, further comprising:
a library of objects, the server selecting the application objects, inspector objects, and inspector documents from the library of objects.

19. The object oriented system of claim 17, where the attribute is an operational attribute of the corresponding application object.

20. The object-oriented system of claim 17, wherein the server is remote to the execution environment.

21. The object-oriented system of claim 17, wherein the server communicates with the execution environment via a network communication protocol.

22. The object-oriented system of claim 17, wherein a first inspector object of the plurality of inspector objects is configured to determine attributes of a first corresponding application object.

23. A method of manipulating objects in an execution environment comprising:
executing an application in a first execution environment, the application comprising a plurality of application objects;

selecting an inspector object for modifying an attribute of an application object of the plurality of application objects;

executing the selected inspector object in the execution environment independent of the application object;

selecting an inspector document corresponding to the inspector object and configured to describe the attribute of the application object, the inspector document independent of the application object;

communicating between the inspector object and the application object using the inspector document, modifying an attribute of the application object; and archiving the application object as modified, wherein the application provides a single view for both end users and developers of the application.

24. The method of claim 23, further comprising:

de-archiving the application object;

executing the de-archived application object in a second execution environment, the second execution environment independent of the first execution environment.

25. The method of claim 23, further comprising:

storing the application object in a library of objects;

selecting the application object in the library; and deploying the application object into the execution environment from the library.

26. The method of claim 23, further comprising:

customizing the inspector document for the application object.

27. The method of claim 23, the step of selecting an inspector object comprising:

presenting a plurality of inspector objects to a user; and selecting the inspector object from the list of inspector objects.

28. The method of claim 23, the step of selecting an inspector object comprising:

providing a server in communication with the execution environment;

identifying attributes of the application object by the server; and automatically selecting an inspector object corresponding to the attributes identified by the server.

29. The method of claim 23, the step of accessing an inspector document comprising:

dynamically discovering attributes of the application object by the inspector object;

creating the inspector document corresponding to the discovered attributes, independent of the application object; and associating the inspector object with the inspector document.

30. The method of claim 23, the step of selecting an inspector object comprising:

assembling a new inspector object; and selecting the new inspector object as the inspector object, wherein the step of assembling a new inspector object is performed without any additional coding.

31. An object-oriented software system on a computer system, comprising:

an execution environment;

a library of application objects;

a server, configured to selectively deploy a first application object and a second application object from the library of application objects into the execution environment, the first application object and the second application object executing in the execution environment independently of the server upon deployment by the server, the server further configured to assemble the first application object and the second application object into an application and to modify attributes of the first application object and the second application object;

an inspector object, executing independently of the first application object and the second application object and configured by the server for modification of attributes of the first application object; and an inspector document associated with the inspector object and independent of the first application object and the second application object, the inspector document configurable to describe the attributes of the first application object, wherein the application provides a single view to end users and developers of the application, and wherein the first application object and the second application object have no predetermined relationship with each other.

32. The object-oriented software system of claim 31, further comprising:

wherein the server is further configured to discover attributes of the first application object, and wherein the server is further configured to configure the inspector document to describe a first attribute of the attributes of the first application object discovered by the server, and wherein the inspector object is configured to use the inspector document to selectively modify the first attribute.

33. The object-oriented software system of claim 31, wherein the inspector document is associated with the inspector object and configured to describe a first attribute of the first application object, wherein the inspector object is configured to use the inspector document to selectively modify the first attribute.

* * * * *